United States Patent
Tsuchiya

(10) Patent No.: US 8,015,493 B2
(45) Date of Patent: Sep. 6, 2011

(54) DATA PROCESSING METHOD AND DATA PROCESSING SYSTEM

(75) Inventor: Kazuhisa Tsuchiya, Kanagawa (JP)

(73) Assignee: Sony Corporation, Tokyo (JP)

( * ) Notice: Subject to any disclaimer, the term of this patent is extended or adjusted under 35 U.S.C. 154(b) by 890 days.

(21) Appl. No.: 10/859,354

(22) Filed: Jun. 3, 2004

(65) Prior Publication Data

US 2005/0005238 A1    Jan. 6, 2005

(30) Foreign Application Priority Data

Jun. 6, 2003  (JP) ................................. 2003-161705

(51) Int. Cl.
*G06F 3/00* (2006.01)
*H04N 5/93* (2006.01)
*H04M 5/00* (2006.01)

(52) U.S. Cl. .......................... 715/723; 379/272; 386/281

(58) Field of Classification Search .................. 715/723; 386/281
See application file for complete search history.

(56) References Cited

U.S. PATENT DOCUMENTS

| | | | | |
|---|---|---|---|---|
| 5,708,650 A | * | 1/1998 | Nakashima et al. | 369/275.3 |
| 5,826,025 A | * | 10/1998 | Gramlich | 709/217 |
| 5,911,776 A | * | 6/1999 | Guck | 709/217 |
| 6,061,697 A | * | 5/2000 | Nakao | 715/513 |
| 6,289,166 B1 | * | 9/2001 | Uno et al. | 386/46 |
| 6,381,615 B2 | * | 4/2002 | Gaither et al. | 707/200 |
| 6,453,113 B1 | * | 9/2002 | Sakai et al. | 386/54 |
| 6,505,964 B1 | * | 1/2003 | Ando et al. | 368/98 |
| 6,608,964 B1 | * | 8/2003 | Saito | 386/52 |
| 6,636,687 B1 | * | 10/2003 | Ando et al. | 386/55 |
| 6,771,881 B1 | * | 8/2004 | Ketcham | 386/55 |
| 6,957,008 B1 | * | 10/2005 | Yasui | 386/55 |
| 6,992,710 B2 | * | 1/2006 | Nagaoka | 348/231.2 |
| 2002/0044759 A1 | * | 4/2002 | Collin et al. | 386/55 |
| 2002/0076198 A1 | * | 6/2002 | Savoie | 386/55 |
| 2002/0122659 A1 | * | 9/2002 | McGrath et al. | 386/117 |
| 2003/0018974 A1 | * | 1/2003 | Suga | 725/86 |
| 2003/0026592 A1 | * | 2/2003 | Kawahara et al. | 386/52 |
| 2003/0086686 A1 | * | 5/2003 | Matsui et al. | 386/52 |
| 2003/0099459 A1 | * | 5/2003 | Yanagita et al. | 386/52 |
| 2004/0013398 A1 | * | 1/2004 | Miura et al. | 386/46 |
| 2004/0244047 A1 | * | 12/2004 | Shinkai et al. | 725/115 |

FOREIGN PATENT DOCUMENTS

| | | | |
|---|---|---|---|
| GB | 2312078 A | * | 10/1997 |
| JP | 2002-077797 | | 3/2002 |
| JP | 2002-300522 | | 10/2002 |

OTHER PUBLICATIONS

Edward Fox Virtual Video Editing in Interactive Multimedia Applications Communications of the ACM Jul. 1989 vol. 32 No. 7.*
Japanese Office Action issued in corresponding application No. 2003-161705 dated Jul. 17, 2007.

* cited by examiner

*Primary Examiner* — Adam M Queler
*Assistant Examiner* — Andrea N Long
(74) *Attorney, Agent, or Firm* — Rader, Fishman & Grauer PLLC

(57) ABSTRACT

A data processing method is disclosed which includes the steps of: (a) generating edit data which includes a unique material identifier for uniquely identifying material data to be edited and of edit content of the material data; (b) generating management data indicative of the unique material identifier in association with a storage location where the material data identified by the unique material identifier are stored; (c) specifying the storage location where the material data associated with the unique material identifier included in the edit data generated in step (a) are stored, on the basis of the management data generated in step (b); and (d) acquiring the material data from the storage location specified in step (c).

5 Claims, 8 Drawing Sheets

FIG. 2

| UMID | FILE NAMES |
|------|------------|
| UMID_1 | FILE_NAME1 |
| UMID_2 | FILE_NAME2 |
| ⋮ | ⋮ |

| UL | L | IN_N | MAT_N |
|----|---|------|-------|

UMID

UMID : UNIQUE MATERIAL IDENTIFIER
UL   : UNIVERSAL LABEL
L    : DATA LENGTH
IN_N : INSTANCE NO.
MAT_N: MATERIAL NO.

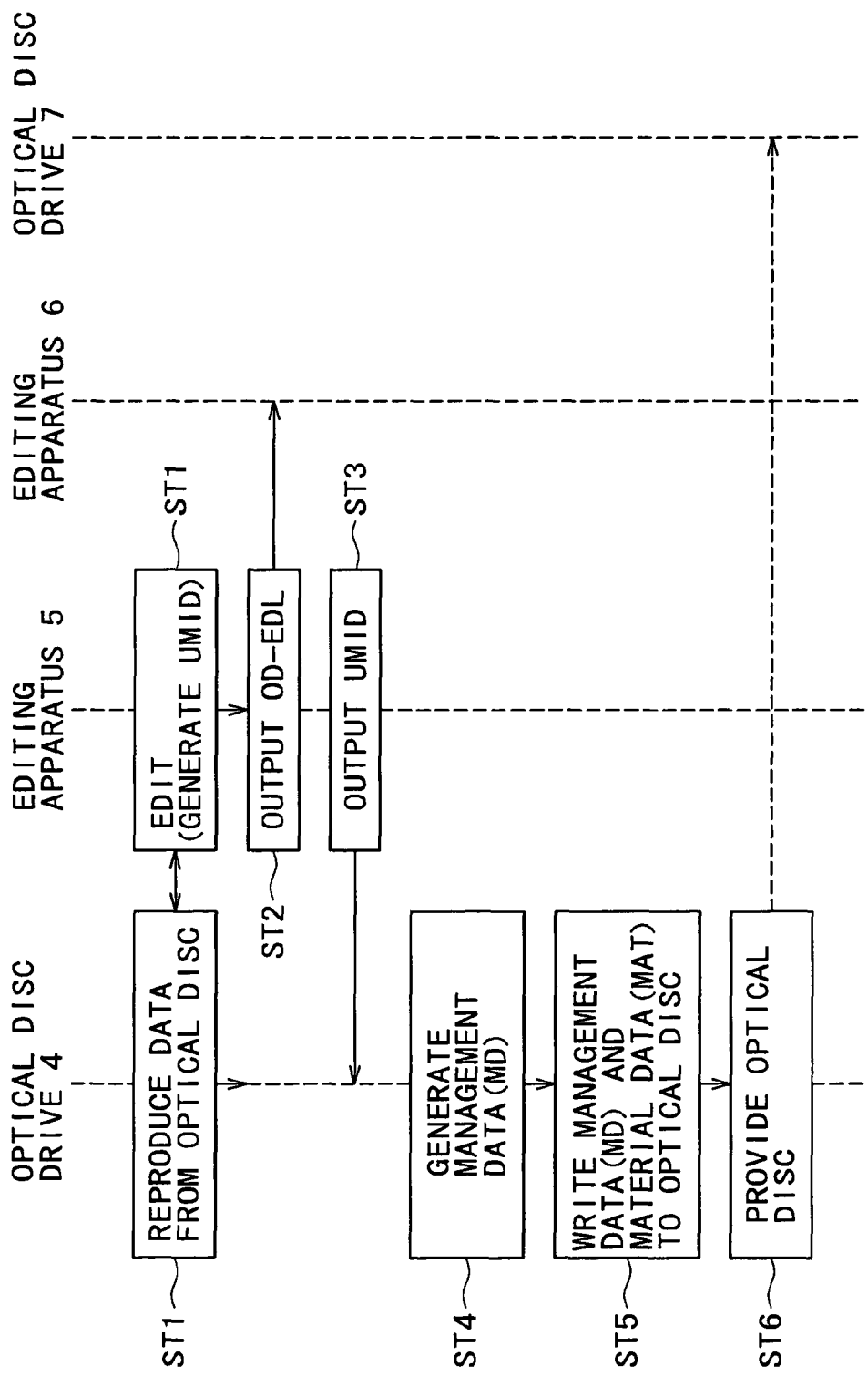

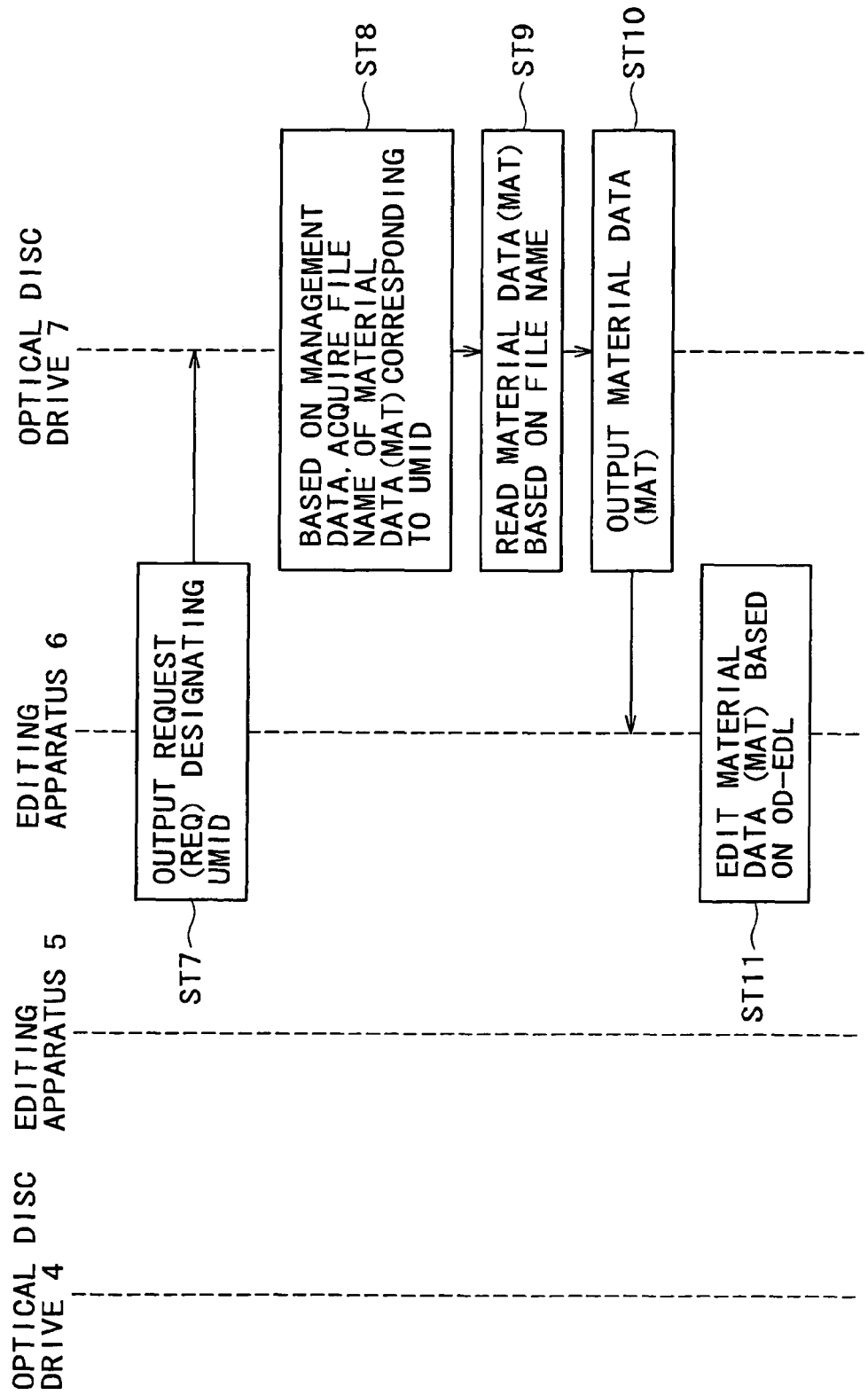

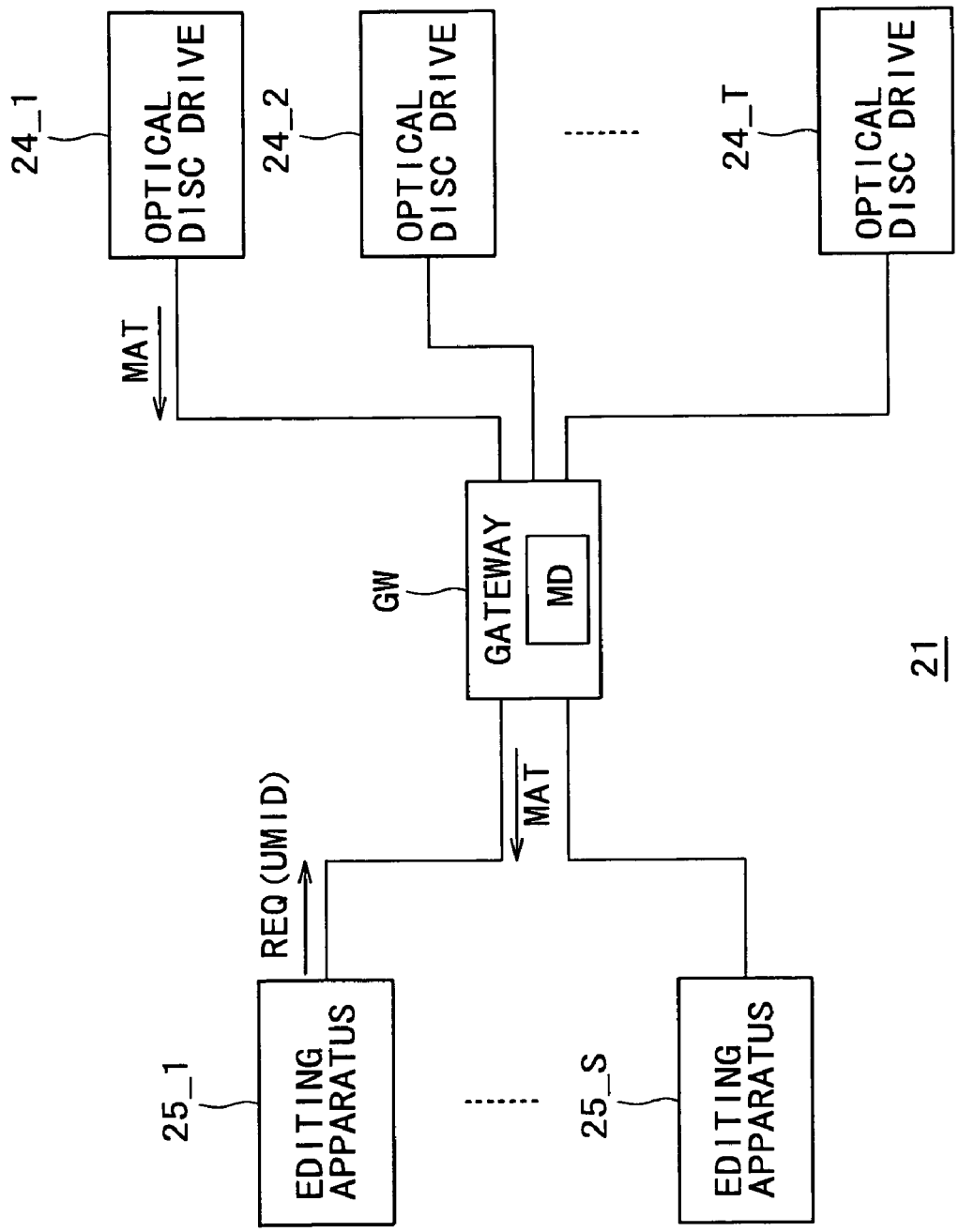

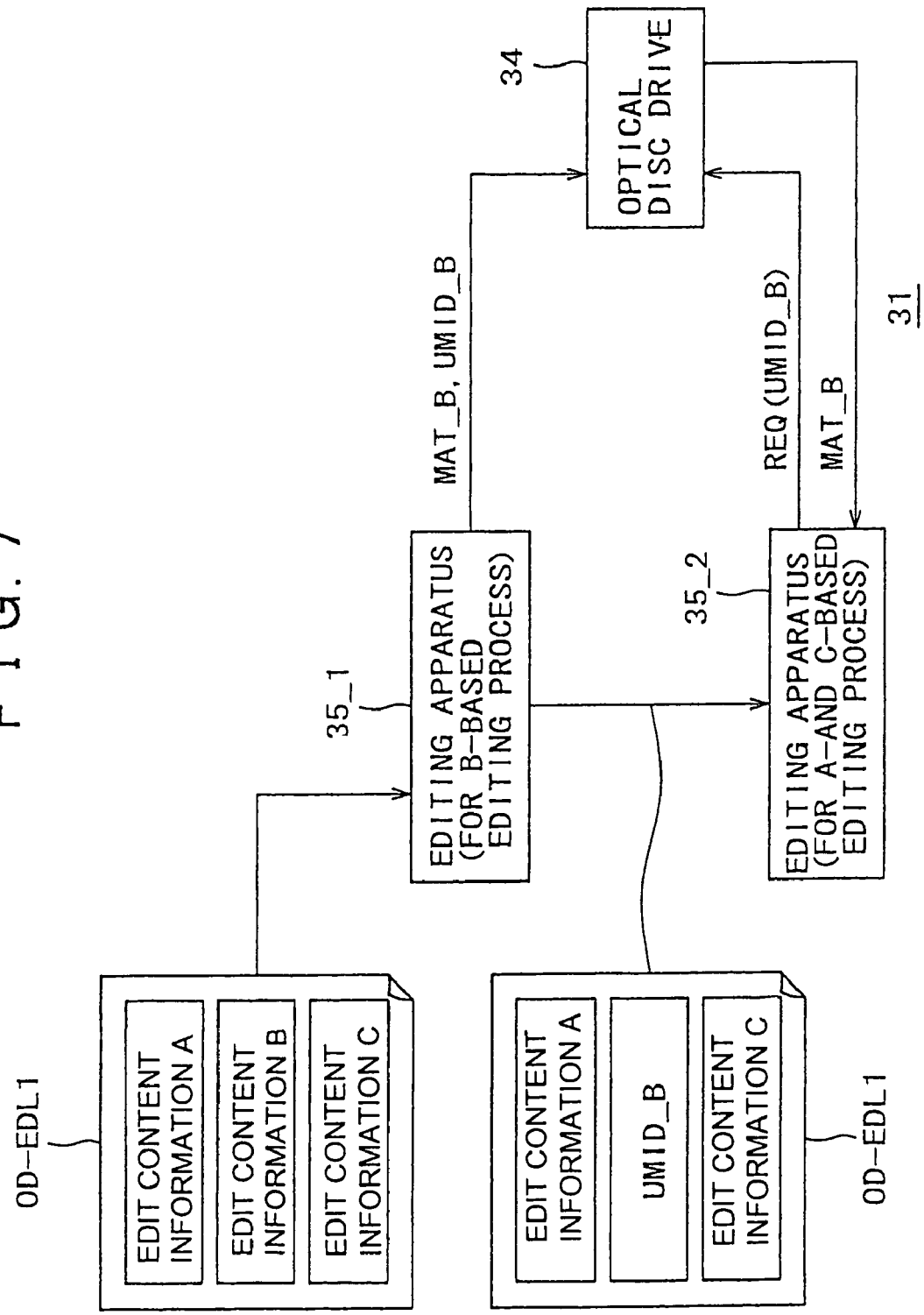

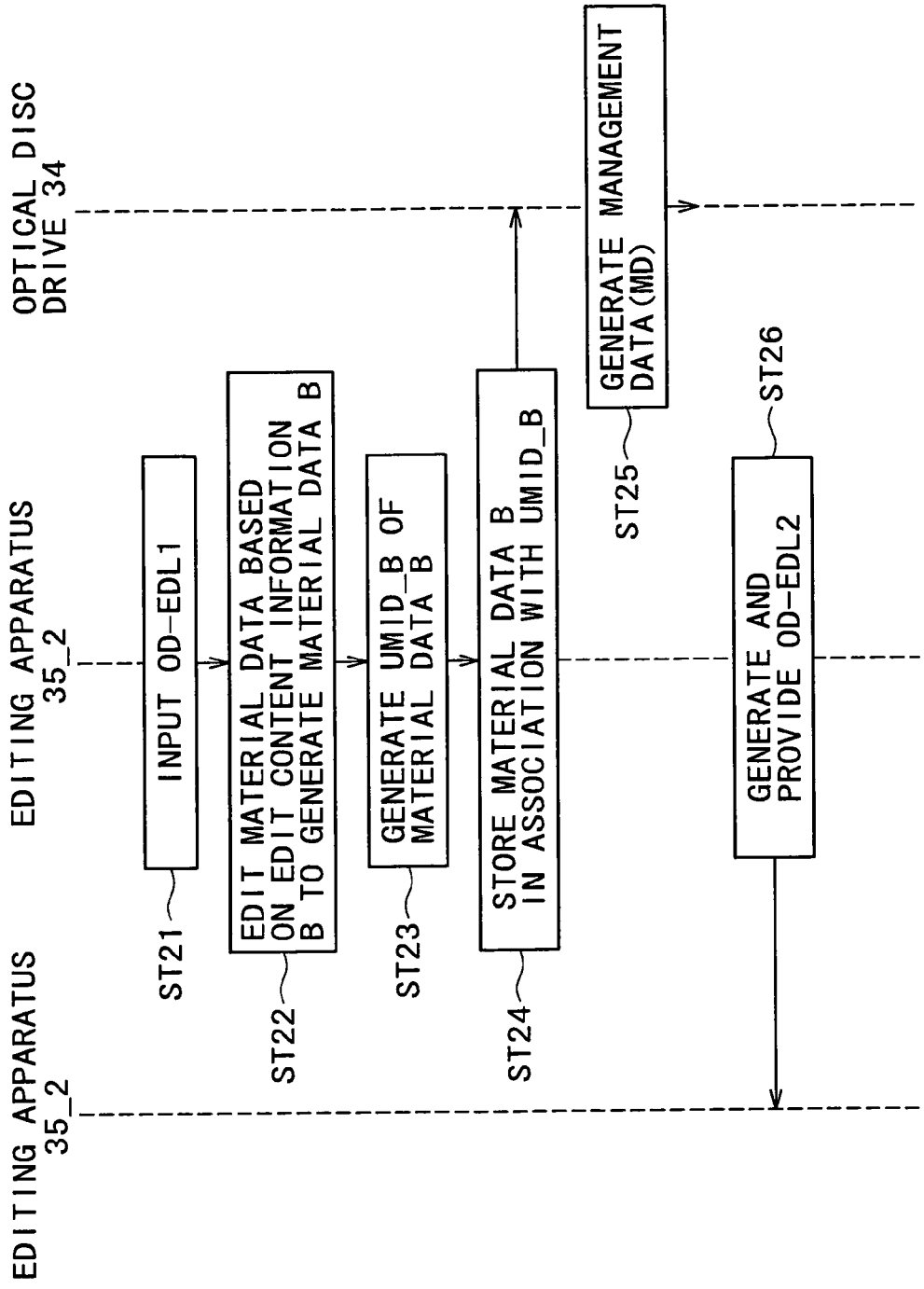

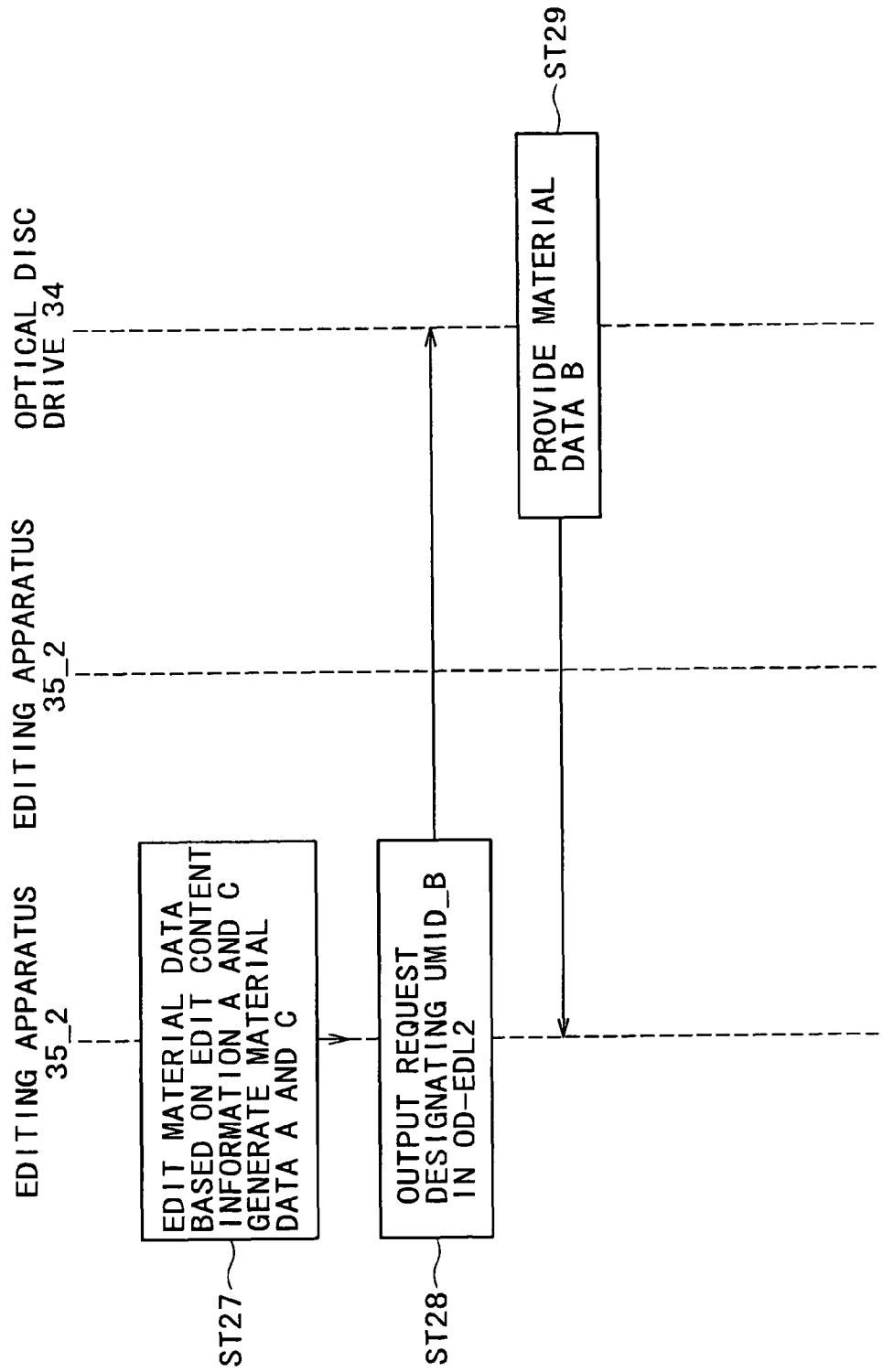

DATA PROCESSING METHOD AND DATA PROCESSING SYSTEM

BACKGROUND OF THE INVENTION

The present invention relates to a data processing method and a data processing system for editing material data based on edit data.

Illustratively, as disclosed in Japanese Patent Laid-open No. 2002-300522, there exists an editing system for performing nonlinear editing processes, such as cut-and-paste, on material data made up of moving pictures in digital form. The system writes the edited material data to suitable media.

An editing apparatus used by such an editing system generates illustratively an edit procedure list (EPL) indicative of edit content of the material data.

The edit procedure list describes a unique material identifier (UMID) for uniquely identifying each item of material data, a time code for indicating in terms of time an edit start point and an edit end point of each material data item, and information about editing operations.

Another editing apparatus that has acquired the edit procedure list EPL needs to obtain the material data to be edited illustratively on the basis of the unique material identifier UMID described in that list EPL.

However, the unique material identifier UMID simply serves to identify uniquely material data. The unique material identifier UMID alone fails to let any other editing apparatus directly recognize a storage location where the material data in question are stored. With no knowledge of the storage location, there is no way the other editing apparatus can obtain the material data.

The same problem is experienced when material data are to be edited by use of an optical disc based on an edit list OD-EDL (optical disc EDL) including the description of unique material identifiers.

SUMMARY OF THE INVENTION

The present invention has been made in view of the above circumstances and provides a data processing method and a data processing system for allowing material data to be acquired appropriately based on a unique material identifier at the time of editing the material data in accordance with edit data including the unique material identifier for uniquely identifying the material data in question.

In carrying out the invention and according to a first aspect thereof, there is provided a data processing method including the steps of: (a) generating edit data which include a unique material identifier for uniquely identifying material data to be edited and edit content of the material data; (b) generating management data indicative of the unique material identifier in association with a storage location where the material data identified by the unique material identifier are stored; (c) specifying the storage location where the material data associated with the unique material identifier included in the edit data generated in step (a) are stored, on the basis of the management data generated in step (b); and (d) acquiring the material data from the storage location specified in step (c).

The data processing method according to the first aspect of the invention functions as follows: In step (a), edit data are generated which include a unique material identifier for uniquely identifying material data to be edited and edit content of the material data. In step (b), management data are generated which are indicative of the unique material identifier in association with a storage location where the material data identified by the unique material identifier are stored. In step (c), the storage location is specified at which the material data associated with the unique material identifier included in the edit data generated in step (a) are stored, on the basis of the management data generated in step (b). In step (d), the material data are acquired from the storage location specified in step (c).

According to a second aspect of the invention, there is provided a data processing system including: a first editing apparatus for generating edit data which include a unique material identifier for uniquely identifying material data and edit content of the material data; a first data processing apparatus for generating management data indicative of the unique material identifier in association with a storage location where the material data identified by the unique material identifier are stored; a second editing apparatus for outputting a request designating the unique material identifier in the edit data received from the first editing apparatus, the second editing apparatus further editing the material data received in response to the request on the basis of the edit data; and a second data processing apparatus which, based on the management data received from the first data processing apparatus in response to the request from the second editing apparatus, specifies the storage location corresponding to the unique material identifier designated by the request, acquires the material data from the storage location, and provides the material data to the second editing apparatus.

The data processing system according to the second aspect of the invention functions as follows: a first editing apparatus generates edit data which include a unique material identifier for uniquely identifying material data and edit content of the material data and provides the edit data to a second editing apparatus.

A first data processing apparatus generates management data indicative of the unique material identifier in association with a storage location where the material data identified by the unique material identifier are stored and provides the management data to a second data processing apparatus.

The second editing apparatus outputs to the second data processing apparatus a request designating the unique material identifier in the edit data received from the first editing apparatus.

Based on the management data received from the first data processing apparatus in response to the request from the second editing apparatus, the second data processing apparatus specifies the storage location corresponding to the unique material identifier designated by the request, acquires the material data from the storage location, and provides the material data to the second editing apparatus.

On the basis of the edit data, the second editing apparatus edits the material data received from the second data processing apparatus.

According to a third aspect of the invention, there is provided a data processing method including the steps of: (a) causing a first editing apparatus to perform an editing process on material data based on first edit data indicative of a first edit content and a second edit content so as to generate first material data, the editing process reflecting the first edit content; (b) causing the first editing apparatus to provide a data processing apparatus with the first material data generated in step (a) and a unique material identifier for identifying the first material data; (c) causing the data processing apparatus to store the first material data received in step (b) in a storage location and to generate management data indicative of the storage location in association with the unique material identifier received in step (b); (d) causing the first editing apparatus to add the unique material identifier to the first edit data so as to generate second edit data and to provide the second edit data to a second editing apparatus; (e) causing the second editing apparatus to perform an editing process on material data based on the second edit data received in step (d), the editing process reflecting the second edit content so as to generate second material data; (f) causing the second editing apparatus to output to the data processing apparatus a request designating the unique material identifier added to the second edit data; and (g) causing the data processing apparatus to acquire the first material data from the storage location corresponding to the unique material identifier designated by the request received in step (f) on the basis of the management data generated in step (c), the data processing apparatus being further arranged to provide the first material data to the second editing apparatus.

The data processing method according to the third aspect of the invention functions as follows:

In step (a), a first editing apparatus is caused to perform an editing process on material data based on first edit data indicative of a first edit content and a second edit content so as to generate first material data, the editing process reflecting the first edit content.

In step (b), the first editing apparatus is caused to provide a data processing apparatus with the first material data generated in step (a) and a unique material identifier for identifying the first material data.

In step (c), the data processing apparatus is caused to store the first material data received in step (b) in a storage location and to generate management data indicative of the storage location in association with the unique material identifier received in step (b).

In step (d), the first editing apparatus is caused to add the unique material identifier to the first edit data so as to generate second edit data and to provide the second edit data to a second editing apparatus.

In step (e), the second editing apparatus is caused to perform an editing process on material data based on the second edit data received in step (d), the editing process reflecting the second edit content so as to generate second material data.

In step (f), the second editing apparatus is caused to output to the data processing apparatus a request designating the unique material identifier added to the second edit data.

In step (g), the data processing apparatus is caused to acquire the first material data from the storage location corresponding to the unique material identifier designated by the request received in step (f) on the basis of the management data generated in step (c), the data processing apparatus being further arranged to provide the first material data to the second editing apparatus.

BRIEF DESCRIPTION OF THE DRAWINGS

Further objects and advantages of this invention will become more apparent upon a reading of the following description and appended drawings in which:

FIG. 2 is an explanatory view of management data MD according to the invention;

FIG. 3 is an explanatory view of a unique material identifier UMID according to the invention;

FIG. 4 is a flowchart of steps in which the editing system as the first embodiment of the invention typically functions;

FIG. 5 is a flowchart of steps continued from the flowchart of FIG. 4;

FIG. 6 is an overall block diagram of an editing system practiced as a second embodiment of this invention;

FIG. 7 is an overall block diagram of an editing system practiced as a third embodiment of this invention;

FIG. 8 is a flowchart of steps in which the editing system as the third embodiment of the invention typically functions; and FIG. 9 is a flowchart of steps continued from the flowchart of FIG. 8.

DETAILED DESCRIPTION OF THE PREFERRED EMBODIMENTS

Figure 1:
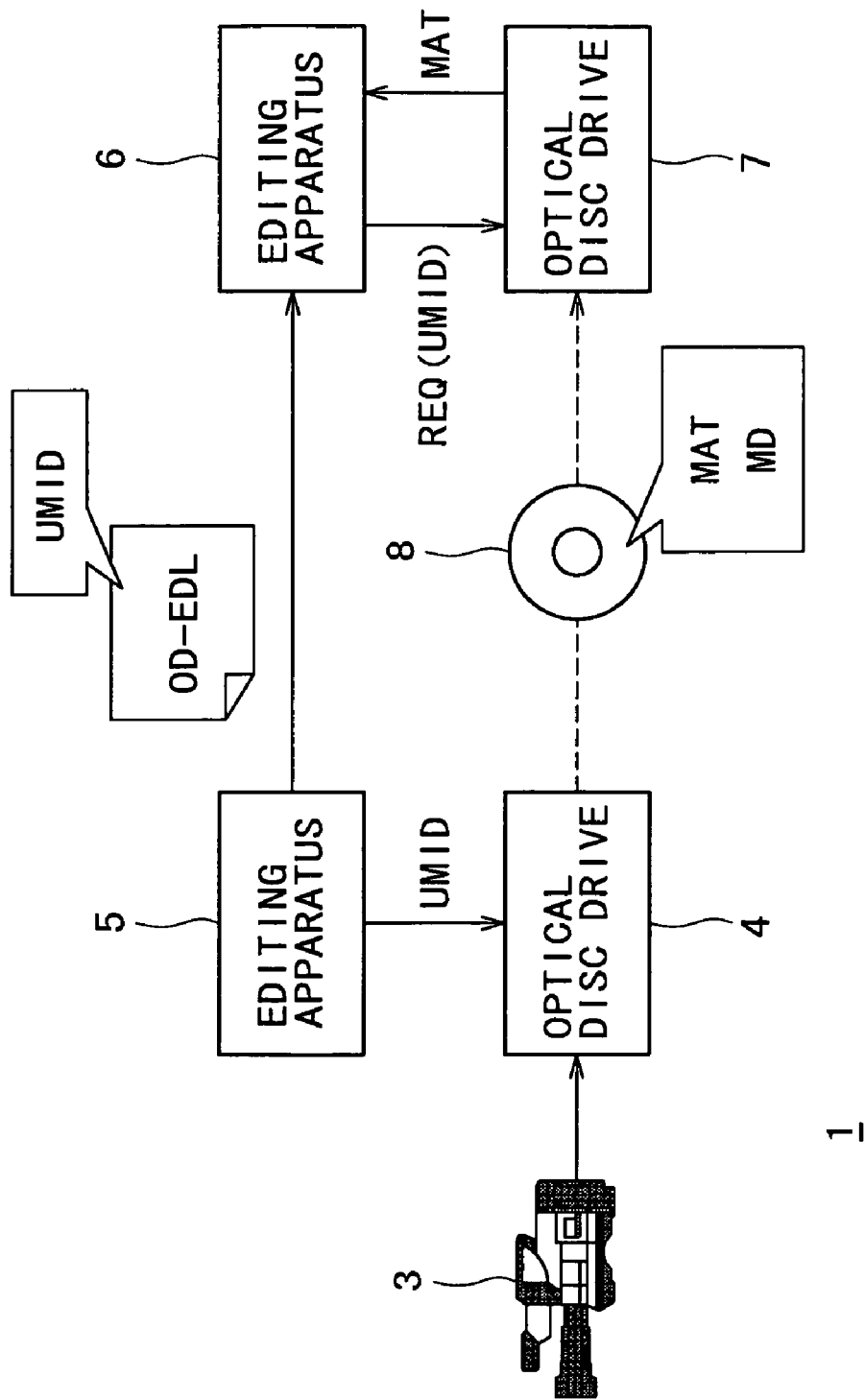
FIG. 1 is an overall block diagram of an editing system practiced as a first embodiment of this invention.

The editing systems practiced as preferred embodiments of this invention will now be described.

First Embodiment

The first embodiment of this invention corresponds to the first and the second aspects of the invention.

FIG. 1 is an overall block diagram of an editing system 1 practiced as the first embodiment of the invention.

As shown in FIG. 1, the editing system 1 illustratively comprises optical disc drives 4 and 7 and editing apparatuses 5 and 6.

The optical disc drive 4 corresponds to the first data processing apparatus according to the first and the second aspects of this invention, the editing apparatus 5 corresponds to the first editing apparatus, the editing apparatus 6 corresponds to the second editing apparatus, and the optical disc drive 7 corresponds to the second data processing apparatus.

In the first embodiment, the editing apparatus 5 edits material data MAT, generates an edit procedure list OD-EDL indicative of edit content detailing what has been edited and of a unique material identifier UMID for identifying the material data MAT, and provides the generated list to the editing apparatus 6. The edit procedure list OD-EDL is a list for use in editing processes involving the use of optical discs.

The optical disc drive 4 writes to an optical disc 8 management data MD indicating the unique material identifier UMID of material data MAT in association with a file name of the material data MAT in question. The optical disc drive 4 writes the material data MAT to the optical disc 8.

The optical disc 8 is loaded into the optical disc drive 7.

Based on the edit procedure list OD-EDL, the editing apparatus 6 outputs to the optical disc drive 7 a request REQ designating a desired unique material identifier UMID.

The optical disc 7 acquires the file name of material data MAT that is designated by the request REQ in accordance with the management data MD, retrieves the material data MAT of interest from the optical disc 8 using the file name (i.e., storage location), and outputs the retrieved material data MAT to the editing apparatus 6. In turn, the editing apparatus 6 edits the material data MAT from the optical disc drive 7 in accordance with the edit procedure list OD-EDL.

The optical disc drive 4 reads material data MAT generated by a camera 3 from a recording medium such as optical discs, including DVD (digital versatile disc) and CD (compact disc), reproduces the material data MAT, generates management data MD, and writes the management data MD and material data MAT to the optical disc 8.

The optical disc 8 is provided illustratively to the optical disc drive 7.

With the first embodiment, the material data MAT are comprised of video data, such as moving pictures, and audio data.

More specifically, as shown in FIG. 2, the optical disc drive 4 generates the management data MD indicative of the unique material identifier UMID input from the editing apparatus 5 with regard to the reproduced material data MAT and of the file name in which to write the material data MAT to the optical disc 8, the unique material identifier UMID being associated with the file name.

The file name illustratively serves to specify the optical disc 8 and a storage address on the optical disc 8.

The unique material identifier UMID complies illustratively with SMPTE (Society of Motion Picture and Television Engineers) standards and has a data format shown in FIG. 3.

As illustrated in FIG. 3, the unique material identifier UMID is in a 32-bit data form that includes a universal label UL, a data length L, an instance number IN_N, and a material number MAT_N.

The universal label UL is a unique identifier indicating that this byte string constitutes a UMID.

The data length L is made of one-byte data indicating the length of the ensuing data in terms of bytes.

The instance number IN_N is illustratively formed by three-byte data indicating the property of the material number MAT_N that follows.

The material number MAT_N is illustratively made of 16-byte data constituting a globally unique number.

The editing apparatus 5 edits the material data reproduced by the optical disc drive 4 illustratively in response to the user's editing operations, generates an edit procedure list OD-EDL including edit content information detailing what has been edited, and outputs the generated list to the editing apparatus 6.

The editing apparatus 5 also generates a unique material identifier UMID for uniquely identifying the material data that have been edited.

The edit content information above includes the unique material identifier UMID of the edited material data, a time code indicating in terms of time the edit start point and the edit end point of the material data in question, and information about the editing operations involved.

The editing apparatus 5 outputs the unique material identifier UMID to the optical disc drive 4.

The editing apparatus 6 edits the material data MAT on the basis of the edit procedure list OD-EDL input from the editing apparatus 5.

More specifically, the editing apparatus 6 first outputs to the optical disc drive 7 a request REQ designating the unique material identifier UMID described in the edit content information included in the edit procedure list OD-EDL input from the editing apparatus 5.

The editing apparatus 6 then edits the material data MAT input from the optical disc drive 7, in keeping with the request REQ.

The optical disc drive 7 stores in an internal memory the management data MD retrieved from the optical disc 8. FIG. 2 shows typical management data MD. Based on the management data MD placed in the internal memory, the optical disc drive 7 acquires the file name corresponding to the unique material identifier UMID designated by the request REQ input from the editing apparatus 6. This process constitutes what is called a resolve function.

In accordance with the acquired file name, the optical disc drive 7 reads the material data MAT from the optical disc 8 and outputs the retrieved data to the editing apparatus 6.

The workings of the editing system 1 shown in FIG. 1 will now be described.

FIGS. 4 and 5 are flowcharts of steps in which the editing system 1 of FIG. 1 typically functions.

In FIGS. 4 and 5, steps ST1 and ST2 correspond to step (a) according to the first aspect of this invention, step ST4 corresponds to step (b), step ST8 corresponds to step (c), and steps ST9 and ST10 correspond to step (d).

Step ST1: A recording medium, such as an optical disc that retains material data made up of video and audio data picked up by the camera 3, is loaded into the optical disc drive 4.

The optical disc drive 4 reads and reproduces the material data MAT from the loaded recording medium as ordered illustratively by the editing apparatus 5.

The editing apparatus 5 generates a unique material identifier UMID of the material data MAT.

The operator at the editing apparatus 5 performs editing operations while viewing reproduced pictures of the material data MAT being reproduced by the optical disc drive 4 and generates an edit procedure list OD-EDL made of edit content detailing what has been edited and the above-mentioned unique material identifier UMID.

Step ST2: The editing apparatus 5 outputs the edit procedure list OD-EDL generated in step ST1 to the editing apparatus 6.

Step ST3: The editing apparatus 5 outputs the unique material identifier UMID generated earlier to the optical disc drive 4.

Step ST4: The optical disc drive 4 generates the management data MD of FIG. 2 indicative of the unique material identifier UMID input from the editing apparatus 5 in step ST3 and of the file name of the material data MAT of interest in association with each other.

Step ST5: The optical disc drive 4 writes to the optical disc 8 the material data MAT reproduced in step ST1 and the management data MD generated in step ST4.

Step ST6: The optical disc 8 acquired in step ST5 is loaded into the optical disc drive 7. The optical disc drive 7 stores illustratively into an internal memory the management data MD that are read from the optical disc 8 and that are shown in FIG. 2.

Step ST7: The editing apparatus 6 outputs to the optical disc drive 7 a request REQ designating the unique material identifier UMID described in the edit procedure list OD-EDL input from the editing apparatus 5 in step ST2. Output of the request REQ is executed by the editing apparatus 6 illustratively under a general protocol, such as FTP (File Transfer Protocol).

Step ST8: The optical disc drive 7 acquires the file name corresponding to the unique material identifier UMID designated by the request REQ input in step ST7, in accordance with the management data MD that are shown in FIG. 2 and that have been placed into the internal memory in step ST6 by what is known as the resolve process.

Step ST9: The optical disc drive 7 reads the material data MAT from the optical disc 8 on the basis of the file name acquired in step ST8.

Step ST10: The optical disc drive 7 outputs to the editing apparatus 6 the material data MAT read from the optical disc 8 in step ST9.

Step ST11: The editing apparatus 6 edits the material data MAT input from the optical disc drive 7 in step ST10 in keeping with the edit procedure list OD-EDL input from the editing apparatus 5 in step ST2.

In the editing system 1, as described above, the editing apparatus 6 first receives the edit procedure list OD-EDL designating the material data MAT based on the unique material identifier UMID. In turn, the editing apparatus 6 outputs the request REQ designating the unique material identifier UMID to the optical disc drive 7. This causes the optical disc drive 7 to acquire the file name of the material data MAT corresponding to the unique material identifier UMID in accordance with the management data MD. The optical disc drive 7 reads the material data MAT from the optical disc 8 based on the acquired file name and provides the retrieved data MAT to the editing apparatus 6. In this manner, the editing apparatus 6 can obtain the material data MAT on the basis of the edit procedure list OD-EDL containing the unique material identifier UMID.

Second Embodiment

In the foregoing description of the first embodiment, the optical disc drive 7 was shown having the so-called resolve function of acquiring the file name of the material data MAT by use of the unique material identifier UMID in accordance with the management data MD shown in FIG. 2. By contrast, the second embodiment is an example in which a gateway GW is equipped with the resolve function.

FIG. 6 is an overall block diagram of an editing system 21 practiced as the second embodiment of this invention. As shown in FIG. 6, the editing system 21 illustratively includes T (an integer of at least 1) optical drives 24_1 through 24_T, S (an integer of at least 1) editing apparatuses 25_1 through 25_S, and a gateway GW.

The editing apparatuses 25_1 through 25_S are each provided with the functionality of the editing apparatus 5 or 6 as part of the above-described first embodiment. The optical disc drives 24_1 through 24_T each read material data MAT from a recording medium, such as an optical disc, in accordance with a file name designated by the gateway GW and output the retrieved material data MAT to the gateway GW.

The gateway GW is located interposingly between the editing apparatuses 25_1 through 25_S on the one hand, and the optical disc drives 24_1 through 24_T on the other hand, and is furnished with the above-mentioned resolve function. More specifically, the gateway GW generates and retains management data MD that are shown in FIG. 2 and that indicate a unique material identifier UMID of each material data item MAT and a file name (i.e., storage location) showing where the material data item MAT in question is located on one of the optical disc drives 24_1 through 24_T. The unique material identifier UMID and the file name are associated with each other.

The gateway GW receives under FTP a request REQ designating a unique material identifier UMID from any one of the editing apparatuses 25_1 through 25_S, acquires the file name corresponding to the unique file identifier UMID in question based on the management data MD, and outputs a read request R_REQ designating the file name to one of the optical disc drives 24_1 through 24_T which corresponds to the file name.

Given the read request R_REQ, one of the optical disc drives 24_1 through 24_T reads the material data MAT accordingly and outputs the retrieved data to the gateway GW. In turn, the gateway GW outputs the retrieved material data MAT to that one of the editing apparatuses 25_1 through 25_S which originated the request REQ. The second embodiment thus provides the same effects as those offered by the first embodiment.

Third Embodiment

The third embodiment corresponds to the third aspect of this invention. The third embodiment involves having a plurality of edit contents described in an edit procedure list OD-EDL1, with material data edited by different editing apparatuses based on the plurality of edit contents so that the edited results are eventually associated with one another into a coherent continuity.

FIG. 7 is an overall block diagram of an editing system 31 practiced as the third embodiment of this invention. As shown in FIG. 7, the editing system 31 illustratively comprises an optical disc drive 34 and editing apparatuses 35_1 and 35_2. In the third embodiment, the editing apparatus 35_1 corresponds to the first editing apparatus according to the third aspect of the invention, the optical disc drive 34 corresponds to the data processing apparatus, and the editing apparatus 35_2 corresponds to the second editing apparatus.

It is assumed that the editing apparatus 35_1 edits data in keeping with edit content information B (to be discussed later) at a higher level of throughput than in accordance with edit content information A and C. It is also assumed that the editing apparatus 35_2 edits data in a manner reflecting the edit content information A and C (to be described later) at a higher level of throughput than on the basis of the edit content information B.

FIGS. 8 and 9 are flowcharts of steps in which the editing system 31 of FIG. 7 typically functions. In FIGS. 8 and 9, step ST22 corresponds to step (a) according to the third aspect of this invention, steps ST23 and ST24 correspond to step (b), step ST25 corresponds to step (c), step ST26 corresponds to step (d), step ST27 corresponds to step (e), step ST28 corresponds to step (f), and step ST29 corresponds to step (g).

Step ST21: The editing apparatus 35_1 inputs an edit procedure list OD-EDL1.

Step ST22: Based on the edit content information B described in the edit procedure list OD-EDL1 input in step ST21, the editing apparatus 35_1 edits the material data designated by the information B in an editing operation also specified by the information B so as to generate material data MAT_B.

Step ST23: The editing apparatus 35_1 generates a unique material identifier UMID_B for the material data MAT_B.

Step ST24: The editing apparatus 35_1 associates the material data MAT_B generated in step ST22 with the unique material identifier UMID_B generated in step ST23 and outputs (i.e., stores) the material data and the identifier in combination to the optical disc drive 34.

Step ST25: The optical disc drive 34 generates management data MD indicative of the material data MAT_B input in step ST24 and of the unique material identifier UMID_B in association with one another.

Step ST26: The editing apparatus 35_1 generates a new edit procedure list OD-EDL2 that supplements the edit procedure list OD-EDL1 from step ST1 with the unique material identifier UMID_B generated in step ST23. The editing apparatus 35_1 outputs the edit procedure list OD-EDL2 thus generated to the editing apparatus 35_2.

Step ST27: The editing apparatus 35_2 edits the material data designated by the edit content information A and C described in the edit procedure list OD-EDL2 input in step ST26 by carrying out the editing operation specified by the information B, thereby generating material data MAT_A and MAT_C.

Step ST28: The editing apparatus 35_2 outputs to the optical disc drive 34 a request REQ designating the unique material identifier UMID_B described in the edit procedure list OD-EDL2 input in step ST26.

Step ST29: Based on the management data MD generated in step ST25, the optical disc drive 34 acquires the file name corresponding to the unique material identifier UMID_B designated by the request REQ input in step ST28. Using the acquired file name, the optical disc drive 34 reads the material data MAT_B stored in step ST24 and outputs the retrieved data MAT_B to the editing apparatus 35_2. In turn, the editing apparatus 35_2 associates the material data MAT_A and MAT_B generated in step ST26 with the material data MAT_B input from the optical disc drive 34.

According to the editing system 31, as described above, editing processes corresponding to the edit content information A, B and C described in the edit procedure list OD-EDL1 are carried out efficiently by different editing apparatuses that are each capable of executing a specific editing process or processes in a manner reflecting particular edit content information at a higher level of throughput than any other apparatus.

Also according to the editing system 31, the material data MAT_B are furnished with the unique material identifier UMID_B. The editing apparatus 35_2 acquires the material data MAT_B suitably on the basis of the unique material identifier UMID_B, so that the material data MAT_A are properly associated with the material data MAT_B.

Although the description above contains many specificities, these should not be construed as limiting the scope of the invention but as merely providing illustrations of some of the presently preferred embodiments of this invention. It is intended that changes and variations may be made without departing from the spirit or scope of the claims that follow.

For example, although the optical disc edit procedure list OD-EDL was shown for use as edit data for this invention, this is not limitative of the invention. Alternatively, the list OD-EDL may be replaced by the edit procedure list EDL.

In the third embodiment above, the editing apparatus 35_1 may alternatively generate an edit procedure list OD-EDL3 by extracting only the edit content information B from the edit procedure list OD-EDL1 in step ST21 of FIG. 8. The editing apparatus 35_1 may then edit material data on the basis of the edit content information B in the list OD-EDL3.

In such a case, the optical disc drive 34 may be arranged to associate the edit procedure list OD-EDL3 with the unique material identifier UMID_B. This allows the editing apparatus 35_2 to acquire the material data MAT_B from the optical disc drive 34.

As described, the invention provides a data processing method and a data processing system for suitably acquiring material data based on a unique material identifier in an editing operation involving the use of edit data containing the unique material identifier for identifying the target material data to be edited.

While the preferred embodiments of the present invention have been described using the specific terms, such description is for illustrative purposes only, and it is to be understood that changes and variations may be made without departing from the spirit or scope of the following claims.

What is claimed is:

1. A data processing method comprising the steps of:
   (a) causing a first editing apparatus to generate edit data that includes a unique material identifier for uniquely identifying material data to be edited, said edit data further including edit content of said material data;
   (b) generating management data indicative of said unique material identifier in association with a storage location where said material data identified by said unique material identifier are stored;
   (c) causing a first data processing apparatus to record said management data and said material data onto a removable storage medium;
   (d) providing said edit data to a second editing apparatus and causing said second editing apparatus to output an editing request designating said unique material identifier to a second data processing apparatus that accesses said removable storage medium;
   (e) causing said second data processing apparatus to specify the storage location where said material data associated with said unique material identifier are stored in response to said editing request, by referring to said management data recorded on said removable storage medium; and
   (f) acquiring said material data from said storage location specified in step (e).

2. A data processing method according to claim 1, further comprising step (g) of editing said material data acquired in step (f) on the basis of said edit data generated in step (a).

3. A data processing method according to claim 1, wherein step (f) comprises causing said second data processing apparatus to acquire said material data from said storage location specified in step (c) and to provide said material data to said second editing apparatus.

4. A data processing system comprising:
   a first editing apparatus for generating edit data comprised of a unique material identifier for uniquely identifying material data and of edit content of said material data;
   a first data processing apparatus for generating management data indicative of said unique material identifier in association with a storage location where said material data identified by said unique material identifier are stored and recording said management data onto an optical disc;
   a second editing apparatus for outputting a request designating said unique material identifier in said edit data received from said first editing apparatus, said second editing apparatus further editing said material data received in response to said request on the basis of said edit data; and
   a second data processing apparatus which, based on said management data received on said optical disc from said first data processing apparatus in response to said request from said second editing apparatus, specifies the storage location corresponding to said unique material identifier designated by said request by referring to said management data recorded on said optical disc, acquires said material data from said storage location, and provides said material data to said second editing apparatus.

5. A data processing system comprising:
   a plurality of editing apparatuses for generating edit data comprised of unique material identifiers for uniquely identifying material data and of edit contents of said material data;
   a plurality of data storage apparatuses for storing said material data;
   a data processing gateway apparatus interposed between the plurality of editing apparatuses and the plurality of data storage apparatuses for generating management data indicative of said unique material identifier in association with a storage location where said material data identified by said unique material identifier are stored, receiving a request from one of the plurality of editing apparatuses designating one of said unique material identifiers in said edit data, and based on said management data specifying the storage location corresponding to said unique material identifier designated by said request, acquiring said material data from said storage location, and providing said material data to the said one of the plurality of editing apparatus;
   wherein said one of the plurality of editing apparatuses further edits said material data received in response to said request on the basis of said edit data.

* * * * *